United States Patent
Barron et al.

(10) Patent No.: US 7,316,508 B2
(45) Date of Patent: Jan. 8, 2008

(54) PROPELLER SHAFT BEARING

(75) Inventors: Alexander Richard William Barron, High Wycombs (GB); Timothy David Biswell, Chinnor (GB); Paul Joseph Hurley, Bourne End (GB)

(73) Assignee: Railko Limited, Buckinghamshire (GB)

( * ) Notice: Subject to any disclaimer, the term of this patent is extended or adjusted under 35 U.S.C. 154(b) by 169 days.

(21) Appl. No.: 10/497,395

(22) PCT Filed: Oct. 23, 2002

(86) PCT No.: PCT/GB02/04782

§ 371 (c)(1),
(2), (4) Date: Apr. 22, 2005

(87) PCT Pub. No.: WO03/048593

PCT Pub. Date: Jun. 12, 2003

(65) Prior Publication Data

US 2006/0177164 A1    Aug. 10, 2006

(30) Foreign Application Priority Data

Nov. 30, 2001    (GB) .................................. 0128660.8

(51) Int. Cl.
F16C 27/02    (2006.01)
(52) U.S. Cl. ............................................ 384/97
(58) Field of Classification Search .................. 384/97, 384/98
See application file for complete search history.

(56) References Cited

U.S. PATENT DOCUMENTS

| | | | | |
|---|---|---|---|---|
| 3,302,988 A | * | 2/1967 | Senter ......................... | 384/97 |
| 3,932,004 A | * | 1/1976 | Orndorff, Jr. ................. | 384/97 |
| 3,971,606 A | * | 7/1976 | Nakano et al. ................ | 384/97 |
| 5,803,611 A | | 9/1998 | Newton et al. ................ | 384/97 |
| 5,880,043 A | | 3/1999 | Lorenz et al. ................ | 442/94 |

FOREIGN PATENT DOCUMENTS

| | | |
|---|---|---|
| EP | 937900 A2 | 8/1999 |
| GB | 564273 A | 9/1944 |
| GB | 805538 A | 12/1958 |
| JP | 59121223 A | 7/1984 |
| WO | 9220929 A1 | 11/1992 |

OTHER PUBLICATIONS

The International Search Report for International Patent Application No. PCT/GB02/04782.
The UK Patent Office Search Report for UK Patent Application No. GB 0128660.8.

* cited by examiner

*Primary Examiner*—Thomas R. Hannon
(74) *Attorney, Agent, or Firm*—Knobbe Martens Olson & Bear LLP

(57) ABSTRACT

A propeller shaft bearing includes a substantially cylindrical sleeve having a structure including an inner layer and an outer layer that surrounds the inner layer. The inner layer is made of a bearing material that includes a thermosetting resin. The outer layer is made of a material that includes a thermosetting resin and has a lower swelling characteristic than the bearing material.

27 Claims, 3 Drawing Sheets

PROPELLER SHAFT BEARING

FIELD OF THE INVENTION

The present invention relates to a propeller shaft bearing for marine vessels and in particular but not exclusively for ships.

BACKGROUND OF THE INVENTION

Most modern naval and merchant ships have in-line propulsion systems utilizing at least one inboard engine that drives an external propeller in the form of a shaft.

Depending on the size of the vessel and required performance, the power requirements of the engine(s), the size and number of propellers and the consequent size and number of the propeller shafts can be calculated. To transmit the power from the engine to the propeller, each shaft needs to be supported in a bearing system. The aft internal structure supporting the shaft with bearings is known as the stern tube. The propeller shaft may additionally be supported by brackets external to the hull, to which additional shaft support bearing systems are fitted. For this application, the shafts generally have a minimum diameter of 150 mm with a resultant minimum wall thickness for the bearing of 15 mm.

Traditionally, the shaft support bearing has been based upon a white-metal/oil lubrication system, although non-metallic/water lubrication systems are also utilised, primarily for naval applications.

In oil lubricated systems, there is a sealing system for the stern tube. The seal has dual functions: to prevent the loss of oil lubricant required by the shaft/bearing, and to prevent the ingress of water into the stern tube.

It is generally accepted that oil seals are prone to damage from extraneous matter found in the aqueous environment. The damage may in certain circumstances cause oil loss with resultant damage to the bearing, or water ingress, which may also be detrimental to the bearing.

For white-metal bearings, the loss of oil may result in an excessive temperature rise, which may cause irreparable damage to the shaft and bearing. Similarly the ingress of water may have a detrimental effect upon the lubrication system and may also result in irreparable damage to the shaft and bearing.

An alternative to the white-metal/oil lubrication system is a non-metallic bearing/oil lubrication system. A typical example of the non-metallic bearing material used in this type of application is the asbestos fibre reinforced phenolic resin bearing material AWA8OH@ manufactured by Railko Ltd. The non-metallic, asbestos fibre reinforced phenolic resin bearings have an increased tolerance to loss of oil lubricant and water ingress.

Non-metallic bearings have traditionally been manufactured to established designs derived for white-metal bearings, and can thus be substituted for the metallic bearings. However, during the course of design, non-metallic bearings have an additional step in the calculation of operational clearance between shaft and bearing. This additional calculation is necessary to accommodate any swelling characteristics in either oil or water of the non-metallic material, and results in an increased running clearance.

The degree of swelling of the non-metallic bearing material is dependent on the radial thickness of the bearing, but can be as much as 1.5%. As a result, it may be necessary to provide a running clearance of 1-3 mm. A large running clearance will allow excessive radial displacement of the shaft and may cause increased friction and heating of the bearing.

A shaft bearing system that not only minimizes damage from extraneous matter in aquatic environments, but also the relatively large running clearance needed when using certain non-metallic bearing elements, would therefore be advantageous. The present invention provides such a shaft bearing system.

SUMMARY OF THE INVENTION

According to the present invention there is provided a propeller shaft bearing including a substantially cylindrical sleeve having a structure including an inner layer and an outer layer that surrounds the inner layer, the inner layer being made of a bearing material that includes a thermosetting resin, and the outer layer being made of a material that includes a thermosetting resin and having a lower swelling characteristic in water than the bearing material.

The bearing of the present invention may be used as a direct replacement for existing metallic and non-metallic bearings. The inner bearing layer provides the required wear and low friction characteristics. The outer layer supports the inner layer and has lower swelling characteristics, thereby significantly reducing the amount of swelling experienced by the bearing as a whole. As a result, the bearing can be manufactured to provide a smaller running clearance, thereby reducing excessive radial displacement and avoiding excessive friction and heating of the bearing.

Advantageously, the inner layer includes a thermosetting resin and a reinforcing material. This combination of materials provides the required bearing characteristics and is tolerant of loss of lubricant and water contamination of the lubricant.

The reinforcing material may include a fibrous material selected from a group including vegetable cellulose fibres from the seed and bast, cellulose viscose fibres, polyester, polyamide, polyacrylonitrile, aramid, polybenzoxyzole, PTFE fibre and carbon fibre, or a blend of two or more of those fibres. Preferably, the fibrous material includes a blend of para-aramid fibre in the range 40% to 100%, cellulose fibre in the range 0% to 30% and polyacrylonitrile fibre in the range 0% to 50%. This combination of materials has been found to perform particularly well. The fibrous material may also includes a small quantity of glass fibre, to increase the strength of the bearing layer and produce a polishing affect on the shaft.

Advantageously, the fibrous material comprises a yarn, a woven fabric or a non-woven sheet, and is preferably a yarn, in particular a resin-impregnated yarn. Advantageously, the reinforcing material comprises from 15% to 60%, and preferably from 30% to 60% by weight of the inner layer.

The thermosetting resin may comprise a phenolic based resin, a polyester based resin or an epoxy based resin, and is preferably a phenolic based resin. The thermosetting resin may comprise from 25% to 60%, and preferably from 30% to 50% by weight of the inner layer.

The inner layer may include a filler material. The filler material may comprise from 0% to 65%, and preferably from 0% to 30% by weight of the inner layer. The inner layer may also include a lubricant material. The lubricant material may comprise from 0% to 35%, and preferably from 10% to 15% by weight of the inner layer.

The outer layer may include a thermosetting resin and a reinforcing material.

The reinforcing material of the outer layer may include a fibrous material selected from a group including glass fibre, carbon fibre, vegetable cellulose fibres from the seed and bast, cellulose viscose fibres, polyester, polyamide, polyacrylonitrile, aramid, polybenzoxyzole, and or a blend of two or more of those fibres. Preferably, the fibrous material of the outer layer includes a blend of glass fibre in the range 40% to 100%, cellulose fibre in the range 0% to 30% and polyacrylonitrile fibre in the range 0% to 50%.

The fibrous material of the outer layer may comprise a yarn, a woven fabric or a non-woven sheet, and is preferably a yarn.

Advantageously, the fibrous material of the outer layer comprises from 40% to 100%, and preferably approximately 70% by weight of the outer layer.

Advantageously, the thermosetting resin of the outer layer comprises a phenolic based resin, a polyester based resin or an epoxy based resin, and is preferably a phenolic based resin. Advantageously, the thermosetting resin comprises from 20% to 60%, and preferably approximately 30% by weight of the outer layer.

The outer layer may include a filler material. Advantageously, the filler material comprises from 0% to 65%, and preferably from 0% to 30% by weight of the outer layer.

The inner layer may have a swelling characteristic in water of between 0.5% and 1.5%. The outer layer may have a swelling characteristic in water of less than 0.5%, and preferably less than 0.2%.

The inner layer may have a thickness in the range 5 mm to 15 mm and preferably of about 10 mm. The outer layer may have a thickness of greater than 30 mm.

Advantageously, the propeller shaft bearing includes a liquid lubricant that is oil, water or glycol based.

DETAILED DESCRIPTION OF THE PREFERRED EMBODIMENTS

Figure 1:
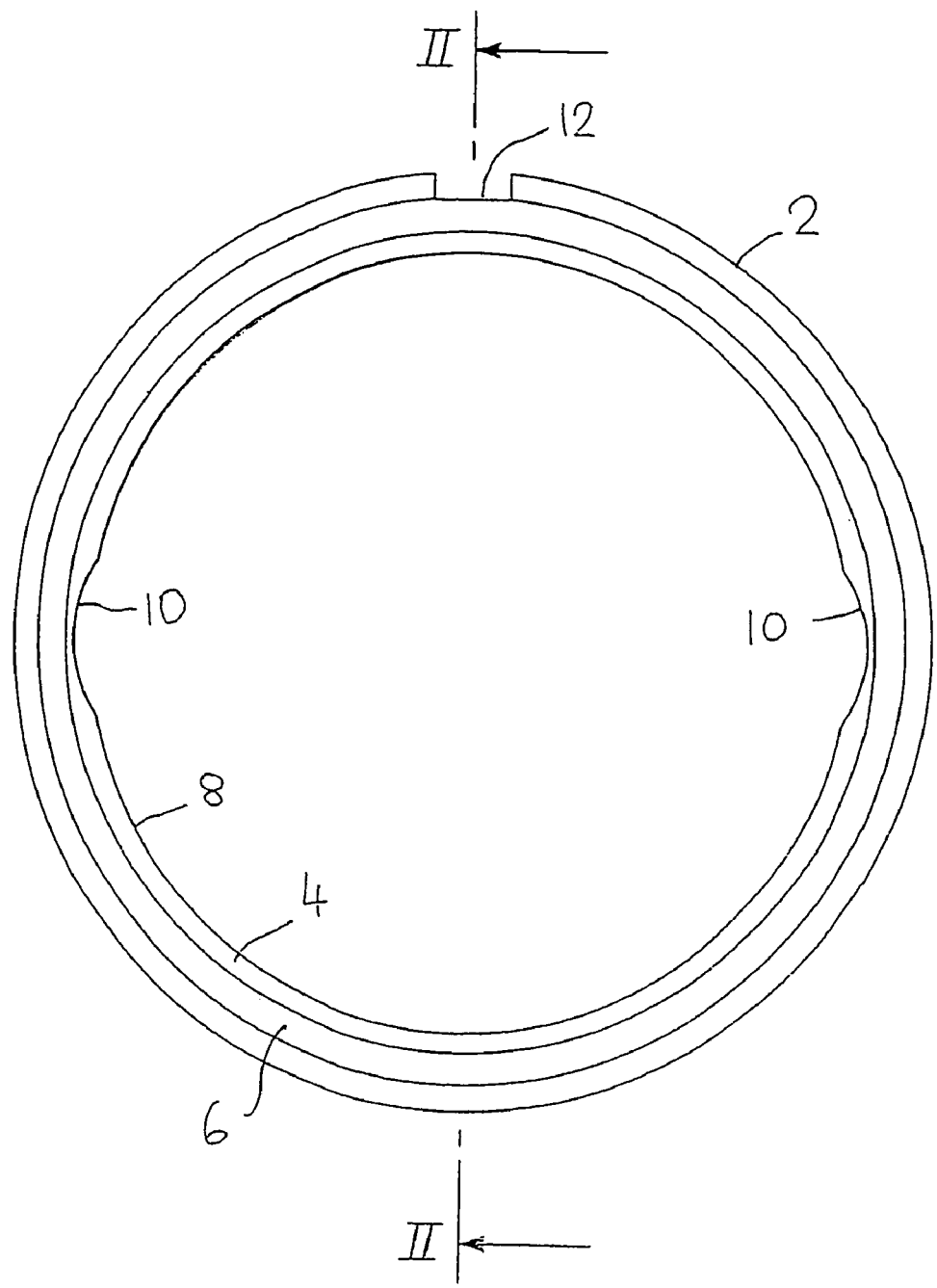
FIG. 1 is an end view of a propeller shaft bearing according to one aspect of the present invention.
Figure 2:
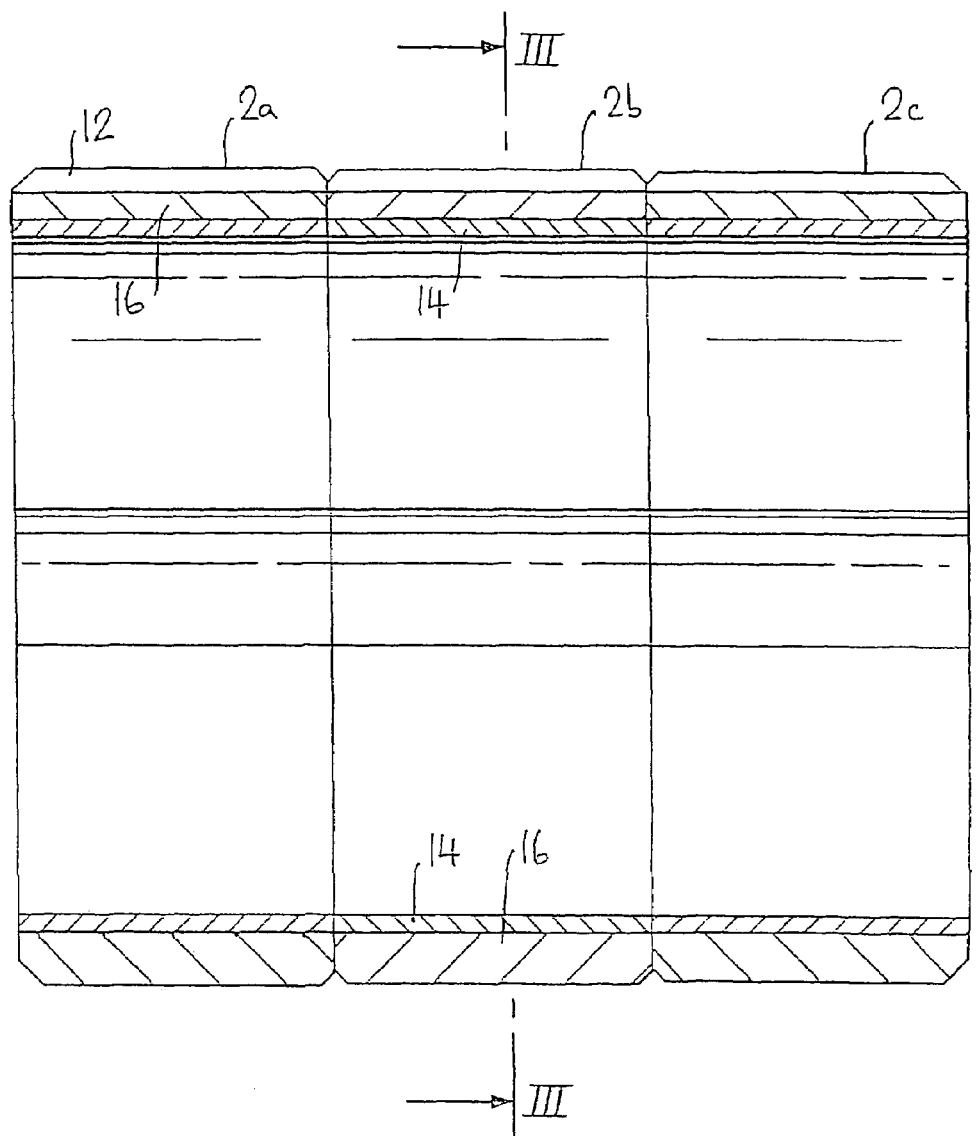
FIG. 2 is a side sectional view, taken along line II-II of FIG. 1.
Figure 3:
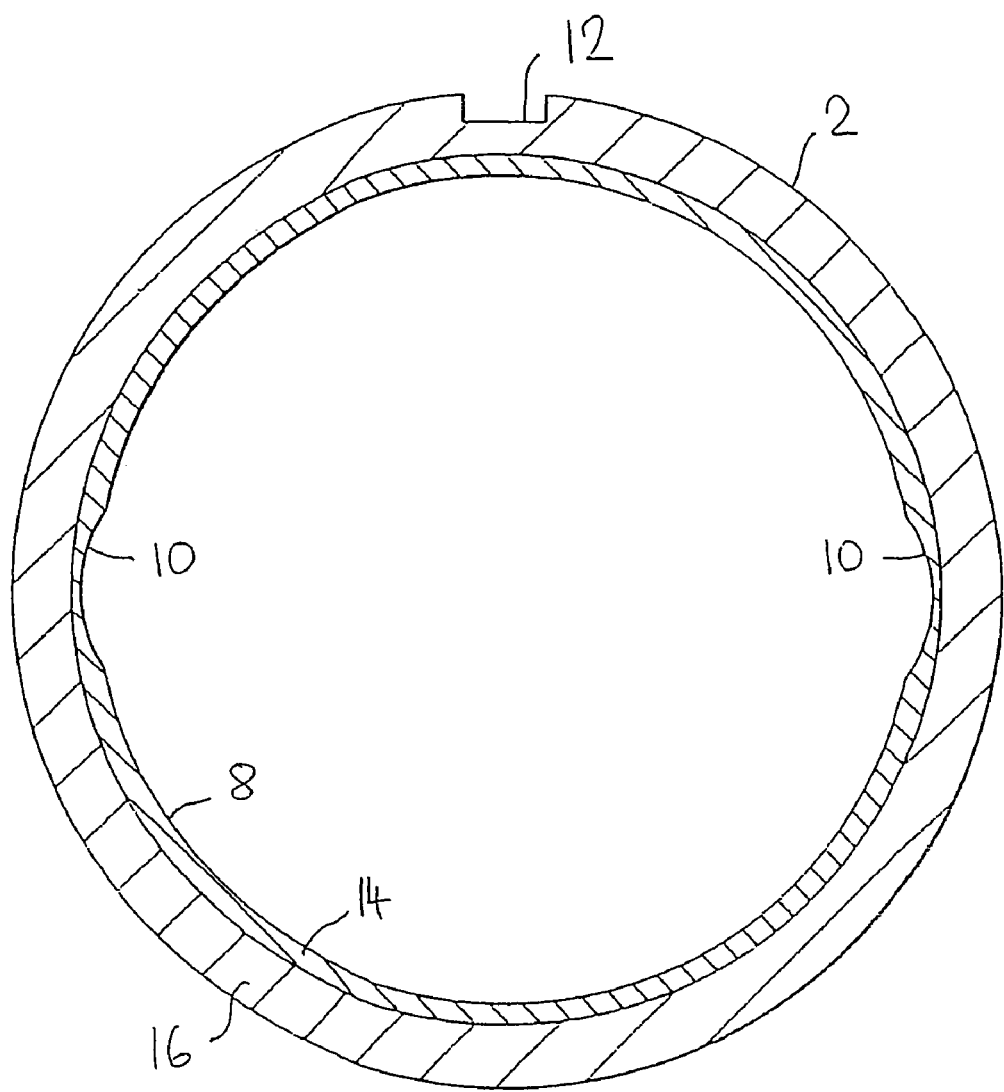
FIG. 3 is a cross sectional view, taken on line III-III of FIG. 2.

Referring now to FIGS. 1-3, the propeller shaft bearing comprises a substantially cylindrical sleeve 2 that, in use, is fitted inside the stem tube (not shown) of a ship. The bearing may be a single or multiple sleeve component. In the embodiment shown in the drawings, the bearing is divided into three separate sleeve components 2a, 2b, and 2c that abut one another end-to-end. The outside diameter of the first section 2a is slightly larger than that of the second section 2b, which is slightly larger than that of the third section 2c. This simplifies the process of inserting the bearing into the stern tube, with which it has a heavy interference fit.

A substantially cylindrical bore extends through the sleeve 2, the surface of the bore providing a bearing surface 8 for the propeller shaft (not shown) that extends through it. Two arcuate oilways 10 are provided as cutouts on either side of the bearing surface 8, to allow the flow of a liquid lubricant through the bearing. For a single screw ship, the oilways 10 are generally located diametrically opposite one another, as shown in the drawing. In a twin screw ship, the oilways are generally positioned higher, at an angle of about 30° above the horizontal diameter of the sleeve. The lubricant may be oil based, water based or glycol based. A keyway 12 is provided in the external surface of the bearing: this engages a key in the stern tube to aid alignment during installation and to prevent rotation of the bearing.

The inner diameter of the bearing may range from 150 mm to more than 1000 mm. Its length is normally between 1.5 and 2.5 times its diameter.

The bearing has a composite structure including an inner layer 14 and an outer layer 16 that surrounds the inner layer. The inner layer 14 is made of a non-metallic bearing material having low friction characteristics, and the outer layer 16 is made of a non-metallic material that has a lower swelling characteristic than the bearing material.

The bearing material of the inner layer 14 includes a thermosetting resin and a reinforcing material that is encapsulated inside the resin.

The reinforcing material includes a fibrous material that is selected from a group including vegetable cellulose fibres from the seed and bast, cellulose viscose fibres, polyester, polyamide, polyacrylonitrile, aramid, polybenzoxyzole, PTFE fibre and carbon fibre and or a blend of two or more of those fibres. For example, the fibrous material may consist of a blend of para- or meta-aramid fibre in the range 40% to 100% and preferably approximately 65%, cellulose fibre (viscose) in the range 0% to 30% and preferably approximately 18%, and polyacrylonitrile (PAN) fibre in the range 0% to 50%, preferably approximately 17%.

The fibrous material may also includes a small quantity (i.e. less than 7%) of glass fibre. Although the glass has an abrasive effect, we have found that the inclusion of a small quantity may be beneficial, as it serves to polish the surface of the propeller shaft.

The fibrous material is preferably supplied in the form of a resin-impregnated yarn, which is wound around a mould to form the sleeve, with the result that the fibres extend circumferentially around the sleeve. If required, the yarn may be wound helically, so that the fibres extend both circumferentially and longitudinally.

Alternatively, the fibrous material may be provided in the form of a woven fabric, in which case the fibres will extend both circumferentially and longitudinally, or a non-woven sheet such as a needle felt, in which case fibres will extend circumferentially, radially and longitudinally.

The reinforcing material comprises from 15% to 60%, and preferably from 30% to 60% by weight of the inner layer.

The thermosetting resin is preferably a phenolic based resin, for example the polycondensation of cresylic acid with formaldehyde. Alternatively, a polyester based resin or an epoxy based resin may be used. The resin generally comprises from 25% to 60%, and preferably from 30% to 50% by weight of the inner layer.

The inner layer 14 may also include a filler material, for example china clay, chalk or dolomite. The filler material typically comprises from 0% to 65%, and preferably from 0% to 30% by weight of the inner layer. The inclusion of a filler material reduces the cost of the bearing without significantly affecting its performance.

The inner layer 14 may include a lubricant material to reduce friction between the bearing and the propeller shaft. This may be a solid lubricant, for example graphite, PTFE or molybdenum disulphide, or a liquid lubricant, for example hydrocarbon based oils, silicone oils or polyester based oils. The lubricant material typically comprises from 0% to 35%, and preferably from 10% to 15% by weight of the inner layer.

The outer layer 16 includes a thermosetting resin and a reinforcing material that is encapsulated in the resin. The reinforcing material comprises a fibrous material, which preferably includes glass fibre, but may also include carbon fibre, vegetable cellulose fibres from the seed and bast, cellulose viscose fibres, polyester, polyamide, polyacrylonitrile, para- or meta-aramid or polybenzoxyzole, or a blend of two or more of those fibres. Preferably, the fibrous material includes a blend of glass fibre in the range 40% to 100%, cellulose fibre in the range 0% to 30% and polyacrylonitrile fibre in the range 0% to 50%.

The fibrous material preferably takes the form of a resin-impregnated yarn, which is wound around a mould to form the sleeve, with the result that the fibres extend circumferentially around the sleeve. If required, the yarn may be wound helically, so that the fibres extend both circumferentially and longitudinally.

Alternatively, the fibrous material may be provided in the form of a woven fabric, in which case the fibres will extend both circumferentially and longitudinally, or a non-woven sheet such as a needle felt, in which case fibres will extend circumferentially, radially and longitudinally.

The thermosetting resin is preferably a phenolic based resin, but may also be a polyester based resin or an epoxy based resin.

The fibrous material of the outer layer 16 comprises from 15% to 80%, and preferably approximately 70% by weight of the outer layer. The thermosetting resin comprises from 20% to 60%, and preferably approximately 30% by weight of the outer layer.

The outer layer 16 may include a filler material, for example china clay, chalk or dolomite. The filler material may constitute from 0% to 65%, and preferably from 0% to 30% by weight of the outer layer.

The inner layer 14 generally has a thickness of from 5 mm to 15 mm, and preferably of about 10 mm. The outer layer 16 generally has a thickness of greater than 30 mm, up to 80 mm or more. The inner layer generally has a swelling characteristic in water of between 0.5% and 1.5% in a direction normal to the reinforcing fibre laminate or winding, whereas the outer layer has a swelling characteristic in water of less than 0.5% and preferably less than 0.2% in the same direction.

For example, in the case of a 500 mm bearing having an inner layer with a thickness of 10 mm and a swelling characteristic of 1%, and an outer layer with a thickness of 50 mm and a swelling characteristic of 0.1%, the thickness of the sleeve will increase in water by only 0.15 mm. A 500 mm shaft requires a minimum running clearance of about 0.9 mm, and this only needs to be increased to about 1.4 mm to accommodate any possible swelling of the bearing.

Some examples of the compositions of the inner and outer layers are given below.

|  | Example 1 | Example 2 | Example 3 |
|---|---|---|---|
| Inner layer |  |  |  |
| Reinforcing fibre | 55% | 35% | 35% |
| Resin | 45% | 35% | 35% |
| Filler | 0% | 30% | 20% |
| Lubricant | 0% | 0% | 10% |

-continued

|  | Example 1 | Example 2 | Example 3 |
|---|---|---|---|
| Outer layer |  |  |  |
| Reinforcing fibre | 70% | 35% | 40% |
| Resin | 30% | 35% | 30% |
| Filler | 0% | 30% | 30% |

It will be appreciated that other compositions are also contemplated.

Although different resin materials may be used for the inner and outer layers, those materials are preferably similar or at least compatible with one another. This allows both materials to be cured simultaneously, providing improved bonding between the two layers and providing high interlaminar shear strength.

What is claimed is:

1. A propeller shaft including a substantially cylindrical sleeve with an inner layer and an outer layer surrounding the inner layer, the inner layer being constructed of a bearing material that includes a thermosetting resin, and the outer layer being made of a material including a thermosetting resin and having a lower swelling characteristic in water as compared to that of the bearing material.

2. The propeller shaft bearing set forth in claim 1, wherein the inner layer includes a thermosetting resin and a reinforcing material.

3. The propeller shaft bearing set forth in claim 2, wherein the reinforcing material includes a fibrous material selected from the group consisting of vegetable cellulose fibres from the seed and bast, cellulose viscose fibres, polyester, polyamide, polyacrylonitrile, aramid, polybenzoxyzole, PTFE fibres carbon fibre, and a blend of two or more of such fibres.

4. The propeller shaft bearing set forth in claim 3, wherein the fibrous material includes a blend of aramid fibre within a range of 40% and 100%, cellulose fibre within a range of 0% and 30% and polyacrylonitrile fibre within a range of 0% and 50%.

5. The propeller shaft bearing set forth in claim 3, wherein the fibrous material includes a relatively small quantity of glass fibre.

6. The propeller shaft bearing set forth in claim 3, wherein the fibrous material comprises a selected yarn, woven fabric, or non-woven sheet.

7. The propeller shaft bearing set forth in claim 2, wherein the reinforcing material comprises between about 15% and about 60% by weight of the inner layer.

8. The propeller shaft bearing set forth in claim 2, wherein the thermosetting resin comprises a phenolic-based resin, a polyester-based resin, or an epoxy based resin.

9. The propeller shaft bearing set forth in claim 2, wherein the thermosetting resin comprises between about 25% and about 60% by weight of the inner layer.

10. The propeller shaft bearing set forth in claim 1, wherein the inner layer includes a selected filler material.

11. The propeller shaft bearing set forth in claim 10, wherein the filler material comprises between about 0% and about 65% by weight of the inner layer.

12. The propeller shaft bearing set forth in claim 1, wherein the inner layer includes a selected lubricant material.

13. The propeller shaft bearing set forth in claim 12, wherein the lubricant material comprises between about 0% and about 35% by weight of the inner layer.

14. The propeller shaft bearing set forth in claim 1, wherein the inner layer has a swelling characteristic in water of between about 0.5% and about 1.5%.

15. The propeller shaft bearing set forth in claim 1, wherein the inner layer has a thickness within a range of 5 mm and 15 mm.

16. The propeller shaft bearing set forth in claim 1, wherein the outer layer includes a selected thermosetting resin and a selected reinforcing material.

17. The propeller shaft bearing set forth in claim 16, wherein the reinforcing material of the outer layer includes a fibrous material selected from the group comprising glass fibre, carbon fibre, vegetable cellulose fibres from seed and bast, cellulose viscose fibres, polyester, polyamide, polyacrylonitrile, aramid, polybenzoxyzole, and a blend of two or more of said fibres.

18. The propeller shaft bearing set forth in claim 17, wherein the fibrous material of the outer layer includes a blend of glass fibre within a range of 40% and 100%, cellulose fibre within a range of 0% to 30%, and polyacrylonitrile fibre within a range of 0% and 50%.

19. The propeller shaft bearing set forth in claim 17, wherein the fibrous material of the outer layer comprises a selected yarn, woven fabric, or non-woven sheet.

20. The propeller shaft bearing set forth in claim 16, wherein the fibrous material of the outer layer comprises between about 15% and 80% by weight of the outer layer.

21. The propeller shaft bearing set forth in claim 16, wherein the thermosetting resin of the outer layer comprises a phenolic-based resin, a polyester-based resin, or an epoxy-based resin.

22. The propeller shaft bearing set forth in claim 16, wherein the thermosetting resin comprises between about 20% and about 60% of the outer layer.

23. The propeller shaft bearing set forth in claim 1, wherein the outer layer includes a selected filler material.

24. The propeller shaft bearing set forth in claim 23, wherein the filler material comprises between about 0% and about 65% by weight of the outer layer.

25. The propeller shaft bearing set forth in claim 1, wherein the outer layer has a swelling characteristic in water of less than about 0.5%.

26. The propeller shaft bearing set forth in claim 1, wherein the outer layer has a thickness greater than about 30 mm.

27. The propeller shaft bearing set forth in claim 1, further comprising a selected liquid lubricant that is oil, water or glycol-based.

* * * * *